Feb. 18, 1969   E. I. VALYI   3,428,126
HEATING UNIT
Filed Feb. 15, 1967

INVENTOR.
EMERY I. VALYI
BY
ATTORNEY

United States Patent Office 3,428,126
Patented Feb. 18, 1969

3,428,126
HEATING UNIT
Emery I. Valyi, Riverdale, N.Y., assignor to Olin Mathieson Chemical Corporation, a corporation of Virginia
Continuation-in-part of application Ser. No. 495,744, Aug. 30, 1965, which is a division of application Ser. No. 398,128, Sept. 21, 1964, which in turn is a division of application Ser. No. 202,612, June 14, 1962, which in turn is a continuation-in-part of application Ser. No. 732,663, May 2, 1958, which in turn is a continuation-in-part of application Ser. No. 586,259, May 21, 1956. This application Feb. 15, 1967, Ser. No. 616,336
U.S. Cl. 165—170           10 Claims
Int. Cl. F28f 3/14; F23d 13/12; F28c 1/00

ABSTRACT OF THE DISCLOSURE

The present disclosure teaches a heating unit adapted to be used as either a burner or a fluid heater. The heating unit comprises: a tubular structure adapted to contain a first fluid, fluid inlet and outlets connected to opposite ends of the tubular structure, a sheet-like porous body metallurgically bonded to the external wall of the tubular structure and channel means between the confronting faces of the porous body and the tubular structure.

---

This application is a continuation-in-part of copending application Ser. No. 495,744, filed Aug. 30, 1965, now abandoned, which in turn is a division of U.S. patent application Ser. No. 398,128, filed Sept. 21, 1964, now U.S. Patent 3,289,750, which in turn is a division of U.S. patent application Ser. No. 202,612, filed June 14, 1962, now U.S. Patent 3,201,858. Said U.S. patent application Ser. No. 202,612 is in turn a continuation-in-part of U.S. patent application Ser. No. 732,663, filed May 2, 1958, now U.S. Patent 3,049,795, which in turn is a continuation-in-part of U.S. patent application Ser. No. 586,259, filed May 21, 1956, now abandoned.

As brought out in the aforesaid copending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy" by Dr. Paul Schwarzkopf (the MacMillan Company, New York, 1947) and "Powder Metallurgy" edited by John Wulff (the American Society for Metals, Cleveland, 1942) no economical and efficient method has been found thus far to overcome the limitations above referred to prior to the invention described in the aforesaid copending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid copending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alterante method disclosed in the foregoing copending applications, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channel defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood, the ultimate use of the resultant integrated structure determines the specific combination of alloys to be employed.

Accordingly, among the objects of this invention is to provide a novel fluid permeable porous metal structure adapted to distribute a fluid and heat in flow therethrough.

Other objects and advantages of this invention will become more apparent from the following drawings and description in which.

Figure 1:
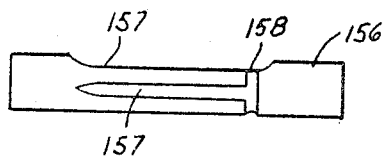
FIGURE 1 illustrates one embodiment of the heating unit of the present invention in a preliminary stage of fabrication.
Figure 2:
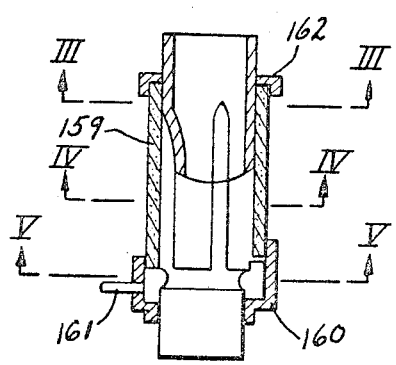
FIGURE 2 illustrates the embodiment of FIGURE 1 in a subsequent stage of fabrication.
Figure 3:
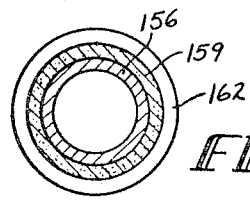
FIGURE 3 is a sectional view along lines III—III of FIGURE 2.
Figure 4:
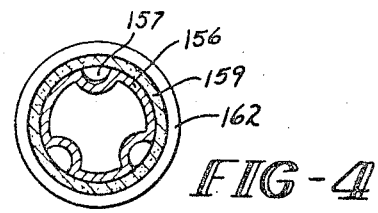
FIGURE 4 is a sectional view along lines IV—IV of FIGURE 2.
Figure 5:
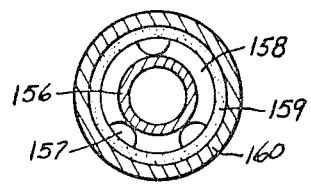
FIGURE 5 is a sectional view along lines V—V of FIGURE 2.

Broadly, the heating unit of the present invention comprises: a tubular structure adapted to contain a first fluid; a fluid inlet connected to one end of said structure; a fluid outlet connected to the opposite end of said structure; a sheet-like porous body metallurgically bonded to the external wall of said structure; channel means disposed between the confronting surfaces of said body and said structure; and inlet means communicating with said channel means.

When said heating unit is utilized as a fluid heater, preferably a water heater, the heating unit includes a conduit substantially surrounding said porous body in adjacent and spaced relationship therewith.

In regard to production of the porous body, it may be obtained by the so called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e., void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of aproximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their repsective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the sintered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

Although a specific mass of sinterable metal has been described, it is pointed out that other formulations of sinterable materials may also be used, as for example those metal oxides, carbides and nitrides, or mixtures thereof, containing if necessary pore or interstice forming materials discussed above. The unification of various components of this embodiment may be accomplished by sintering at temperatures sufficient to sinter the particulate substance within itself and to the sheet metal member in all regions in which the two bodies are in contact.

As will be understood, the selection of materials from which the porous and solid components are made to comprise the structures described herein and in the copending applications, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the copending applications, which catalysts may be non-metallic. The porous layer may also consist in part or entirely of glasses, carbides, nitrides, oxides, or borides, for example in instances calling for heat resistance, corrosion resistance or insulating properties not available in metals and alloys. The porous layer may also consist of synthetic polymeric substances, for similar reasons, as for example sintered porous fluoro-carbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Non-metallic components may be utilized. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby, through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the above-identified patent applications.

As indicated above, the composite structures of this invention are adapted for many applications and particularly for use as heat exchangers. As is well known, tubular components used in heat exchangers were heretofore usually provided with fins, corrugations and other extensions of their surface so as to present an economic maximum extended surface area for a given weight of heat exchanger structure. However, such heat exchanger structures can be provided with greatly increased heat transfer surfaces by i.e., heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the large surface area within the porous body, as defined by the innumerable interstices extending between the integrated particles of the porous body. For example for application in refrigerator systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

Among the many applications to which the invention lends itself are novel gas burners in which combustible gases or partly or entirely vaporized combustible liquids are caused to flow through the fluid channels formed between the solid and the porous components of the composite structure. As indicated above, such combustible fluids conducted in this manner will permeate the porous component and, diffusing therethrough, distribute themselves uniformly on the external face thereof. Such fluids may be ignited at the time they emerge at the external face of the porous component, adapted the entire unit for use as a gas burner with characteristics of very uniform distribution of the flame. In addition, with appropriate choice of conditions during combustion, and appropriate adjustment of pressures, fuels and materials, it is possible to adapt the structure as a source of radiant heat, provided the structure is allowed to reach a temperature at which it is capable of radiating heat at an appreciable rate.

In accordance with one embodiment of this application illustrated in FIGURES 1 to 5 a sheet metal tube 156 is provided with a pattern of channels comprising longitudinally extending grooves 157 interconnected to a circumferentially extending groove 158. Thereafter the tube may be surrounded by a cylindrical envelope of sintered porous metal 159 with the two components bonded together at the unembossed portions of the tube 156. The burner is completed by the provision of a manifold ring 160 disposed to encompass the header groove 158 and adapted to be provided with an inlet conduit 161. If desired, the burner may be reinforced by the provision of a retainer ring 162 disposed to assist in strengthening the burner and to further contain the gaseous medium flowing through the porous component. The resultant structure will have a manifold which is arranged to interconnect channels disposed between the solid and the porous component layers and through which manifold, combustible gases are caused to flow into the channels to be distributed through the porous component, whereupon, on emerging from the external face of the porous component, the gases may be ignited.

Preferably, the burner will be so arranged so that the tube will be disposed in an upright position and made to function as an air aspirator, so that as the burner gradually heats up, so will the air contained within the tube. In this manner the air will rise and in so doing, cause cool ambient air to enter the tube. Thus, a cooling air stream will be set up to flow through the tube to effectively cool the structure during the burning of the combustible gas.

Alternately, if desired, a coolant, such as water, may be caused to circulate through the solid tube to cool the structure while the gas burns. A specific embodiment for the foregoing application comprised a burner of approximately 11 inches long, 0.75 inch in diameter with a $\frac{1}{16}$ inch thickness in the porous component enveloping a $\frac{1}{16}$ inch thick solid tube. In operation, this specific embodiment produces a heat output of 1,750 B.t.u./hour/ square inch per effective outer metal surface, with the combustible gas comprising a gas-air mixture ratio of 1:10 under a pressure of 2 pounds per square inch. As can be observed, such a burner output is very appreciable as compared to other gas burners of equal size, weight, and cost. In addition, it is noted that the flame produced was highly controllable and, at the proper setting, completely uniform in blue. In modifications utilizing water circulation through the center of a tube, the overall structure was cool to the touch even after the burner had been operating for an appreciable length of time.

In an additional experiment, the same burner was surrounded by a cylindrical screen made of stainless steel at a distance of approximately ⅛ inch to ¼ inch from the external surface of the porous component. The screen being heated by the flame, emerging from the burner body, radiated heat at approximately 1500° F. while the burner operated as noted above. The specific burner tested was made of copper and could therefore not have served as a radiating body by itself. However, had it been made of stainless steel, then its temperature could have been allowed to rise sufficiently for the burner of itself to act as a radiant body instead of using an external wire screen cylinder for this purpose.

Figure 6:
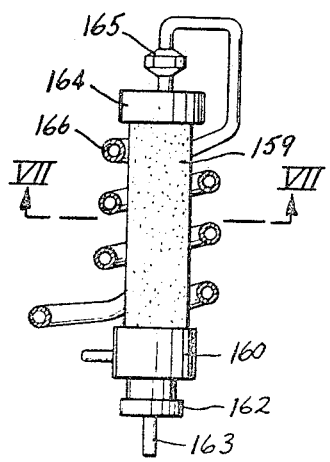
FIGURE 6 is a partial sectional view of the heating unit of the present invention for use as a water heater.
Figure 7:
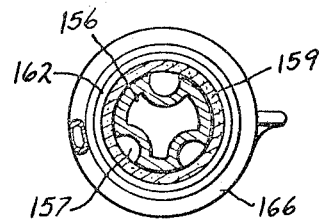
FIGURE 7 is a sectional view along lines VII—VII of FIGURE 6.

As will be recognized, the foregoing burner can be adapted into a very economical water heater by the provision of a tubular coil surrounding the external face of the porous component. In one such embodiment, shown in FIGURES 6 and 7, the burner may be provided at one end or lower end with a closure member 162 having suitably connected thereto an inlet conduit 163, and an outlet closure member 164 interconnecting the interior of the burner by means of appropriate tubular connections 165 to a helical coil 166 encircling the porous component 159. Although a specific embodiment has been illustrated, it will be readily apparent that the afore-described water heater can be made several ways, always utilizing the principle of inducing water flow within the burner structure first to preheat while cooling the burner structure, and then in continuation of the water through the coils surrounding the burner.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A heating unit comprising an annular tubular structure adapted to contain a first fluid, a fluid inlet communicating with one end of said structure, a fluid outlet communicating with the opposite end of said structure, a sheet-like porous body metallurgically bonded to the external wall of said structure, channel means disposed between the confronting surfaces of said porous body and said tubular structure, said channel means comprising at least one longitudinally extending channel on said tubular structure interconnected to a circumferentially extending channel on said tubular structure, inlet means communicating with said channel means, whereby a gaseous medium introduced into said inlet means flows through said channel means and through said porous body.

2. A heating unit in accordance with claim 1 wherein said channel means comprise a plurality of longitudinally extending grooves on said tubular structure interconnected to a circumferentially extending groove on said tubular structure.

3. A heating unit in accordance with claim 1 wherein said sheet-like porous body surrounds said tubular structure.

4. A heating unit in accordance with claim 2 including a manifold ring surrounding said circumferentially extending groove, with said inlet means communicating with said manifold ring.

5. A heating unit in accordance with claim 2 including a retaining ring supporting said porous body.

6. A heating unit comprising an annular tubular structure adapted to contain a first fluid, a fluid inlet connected to one end of said structure, a fluid outlet connected to the opposite end of said structure, a sheet-like porous body metallurgically bonded to the external wall of said structure, channel means disposed between the confronting surfaces of said porous body and said tubular structure, said channel means comprising at least one longitudinally extending channel on said tubular structure interconnected to a circumferentially extending channel on said tubular structure, inlet means communicating with said channel means, whereby a gaseous medium introduced into said inlet means flows through said channel means and through said porous body, and a conduit substantially surrounding said porous body in adjacent and spaced relationship therewith.

7. A heating unit in accordance with claim 6 wherein said tubular conduit is helically wound about said porous body in adjacent and spaced relationship therewith.

8. A heating unit in accordance with claim 6 including second conduit means interconnecting one end of said tubular conduit and said fluid outlet.

9. A heating unit according to claim 6 including a closure member connected to said fluid inlet and a closure member connected to said fluid outlet.

10. A heating unit according to claim 6 wherein said channel means comprises a plurality of longitudinally extending grooves on said tubular structure interconnected to a circumferentially extending groove on said tubular structure.

References Cited

UNITED STATES PATENTS

| | | | |
|---|---|---|---|
| 3,170,512 | 2/1965 | Smith | 165—110 |
| 2,766,597 | 10/1965 | Gieck | 62—314 |
| 2,946,681 | 1/1957 | Probst et al. | 253—77 X |
| 3,168,137 | 2/1965 | Smith | 165—110 |

ROBERT A. O'LEARY, *Primary Examiner.*

THEOPHIL W. STREULE, *Assistant Examiner.*

U.S. Cl. X.R.

431—328; 62—315; 122—32